(12) United States Patent
Ko et al.

(10) Patent No.: US 10,410,638 B2
(45) Date of Patent: Sep. 10, 2019

(54) METHOD AND DEVICE FOR TRANSFORMING FEATURE VECTOR FOR USER RECOGNITION

(71) Applicants: SAMSUNG ELECTRONICS CO., LTD., Suwon-si (KR); Korea University Research and Business Foundation, Seoul (KR)

(72) Inventors: Hanseok Ko, Seoul (KR); Sung-soo Kim, Bucheon-si (KR); Jinsang Rho, Anyang-si (KR); Suwon Shon, Seoul (KR); Jae-won Lee, Seoul (KR)

(73) Assignees: SAMSUNG ELECTRONICS CO., LTD., Suwon-si (KR); Korea University Research and Business Foundation, Seoul (KR)

(*) Notice: Subject to any disclaimer, the term of this patent is extended or adjusted under 35 U.S.C. 154(b) by 0 days.

(21) Appl. No.: 15/553,819

(22) PCT Filed: Feb. 27, 2015

(86) PCT No.: PCT/KR2015/001953
§ 371 (c)(1),
(2) Date: Aug. 25, 2017

(87) PCT Pub. No.: WO2016/137042
PCT Pub. Date: Sep. 1, 2016

(65) Prior Publication Data
US 2018/0033439 A1 Feb. 1, 2018

(51) Int. Cl.
*G10L 17/06* (2013.01)
*G10L 17/02* (2013.01)
(Continued)

(52) U.S. Cl.
CPC ............. *G10L 17/06* (2013.01); *G10L 17/02* (2013.01); *G10L 17/22* (2013.01); *G10L 17/16* (2013.01)

(58) Field of Classification Search
CPC .......... G10L 17/02; G10L 17/06; G10L 17/22
See application file for complete search history.

(56) References Cited

U.S. PATENT DOCUMENTS 5,216,720 A * 6/1993 Naik .................. G10L 17/00
704/272
6,609,093 B1 * 8/2003 Gopinath ............. G06K 9/6234
382/190
(Continued)

FOREIGN PATENT DOCUMENTS

CN 101546555 A 9/2009
KR 10-0563316 B1 3/2006
(Continued)

OTHER PUBLICATIONS

International Search Report and Written Opinion dated Nov. 27, 2015 by the International Searching Authority in counterpart International Patent Application No. PCT/KR2015/001953 (PCT/ISA/210 & PCT/ISA/237).
(Continued)

*Primary Examiner* — Angela A Armstrong
(74) *Attorney, Agent, or Firm* — Sughrue Mion, PLLC (57) ABSTRACT

A method of converting a feature vector includes extracting a feature sequence from an audio signal including utterance of a user; extracting a feature vector from the feature sequence; acquiring a conversion matrix for reducing a dimension of the feature vector, based on a probability value acquired based on different covariance values; and converting the feature vector by using the conversion matrix.

9 Claims, 4 Drawing Sheets

(51) Int. Cl.
*G10L 17/22* (2013.01)
*G10L 17/16* (2013.01)

(56) References Cited

U.S. PATENT DOCUMENTS

| | | | |
|---|---|---|---|
| 7,941,317 B1 | 5/2011 | Goffin et al. | |
| 9,780,856 B2 * | 10/2017 | Cai | ............. H04B 7/0617 |
| 2008/0065380 A1 | 3/2008 | Kwak et al. | |
| 2016/0019883 A1 * | 1/2016 | Aronowitz | ............. G10L 17/04 |
| | | | 704/244 |

FOREIGN PATENT DOCUMENTS

| | | |
|---|---|---|
| KR | 10-0826875 B1 | 5/2008 |
| KR | 10-1094763 B1 | 12/2011 |
| KR | 10-1430730 B1 | 8/2014 |

OTHER PUBLICATIONS

Nagendra Kumar et al., "Heteroscedastic discriminant analysis and reduced rank HMMs for improved speech recognition", Speech Communication, Dec. 1998, pp. 283-297, vol. 26, Issue 4, <URL: http://www.sciencedirectcom/scieiice/article/pii/!0167639398000612>.

* cited by examiner

METHOD AND DEVICE FOR TRANSFORMING FEATURE VECTOR FOR USER RECOGNITION

TECHNICAL FIELD

One or more embodiments relate to a method and device for converting a feature vector for identifying a user. More particularly, one or more embodiments relate to a method and device for extracting a feature vector, which is a unique property of a user, from an audio signal of the user and converting the extracted feature vector, in order to identify the user.

BACKGROUND ART

Speaker recognition is technology of extracting unique information of a user from an audio signal of the user and verifying whether a voice uttered when a speaker was claimed corresponds to the claimed speaker.

For speaker recognition, a feature vector, which is a unique property of an audio signal input by a user, has to be extracted from the input audio signal. Since the feature vector has a high dimension and thus requires many calculations during speaker authentication, a device for extracting a feature vector can reduce the dimension of the feature vector by converting the feature vector by linear discriminant analysis (LDA).

According to LDA, each class of a feature vector is assumed to be homoscedastic. However, each class of an actual feature vector may be heteroscedastic. Accordingly, when the dimension of a feature vector is reduced according to LDA, the performance of a speaker recognition system may be degraded due to an assumption that is different from the assumption of actual data.

DETAILED DESCRIPTION OF THE INVENTION

Technical Solution

One or more exemplary embodiments include a method and device for converting a feature vector, which is a unique property of a user, from an audio signal of the user. More particularly, one or more exemplary embodiments include a method and device for extracting and converting a feature vector in order to reduce the dimension of the feature vector.

Advantageous Effects

According to an embodiment, the performance of speaker recognition may be increased by reducing the dimension of an i-vector by using an HLDA conversion matrix which takes into account the fact that classes have different covariance matrices.

BEST MODE

A method of converting a feature vector includes extracting a feature sequence from an audio signal including utterance of a user; extracting a feature vector from the feature sequence; acquiring a conversion matrix for reducing a dimension of the feature vector, based on a probability value acquired based on different covariance values; and converting the feature vector by using the conversion matrix.

The conversion matrix is a heteroscedastic linear discriminant analysis (HLDA).

The acquiring of the conversion matrix includes acquiring a useful dimension p of the conversion matrix, based on accumulated energy for each dimension of a variance matrix for an intra-class covariance matrix of each speaker.

The feature vector is an i-vector that is acquirable by joint factor analysis.

The method further includes performing scoring on a feature vector resulting from the conversion and a feature vector of each state, at least once; and identifying the user, based on a result of the scoring.

A device for converting a feature vector includes a receiver which receives an audio signal including utterance of a user; and a controller which extracts a feature sequence from the audio signal, extracts a feature vector from the feature sequence, acquires a conversion matrix for reducing a dimension of the feature vector, based on a probability value acquired based on different covariance values, and converts the feature vector by using the conversion matrix.

MODE OF THE INVENTION

Embodiments will now be described more fully with reference to the accompanying drawings. However, in order to clarify the spirit of the invention, descriptions of well known functions or constructions may be omitted. In the drawings, like numbers refer to like elements throughout.

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

Some elements are exaggerated, omitted, or schematically illustrated in the drawings. As such, actual sizes of respective elements are not necessarily represented in the drawings. The present invention is not limited by relative sizes and/or intervals in the accompanying drawings.

The terms "comprises" and/or "comprising" or "includes" and/or "including" when used in this specification, specify the presence of stated elements, but do not preclude the presence or addition of one or more other elements. Also, the term "unit" in the embodiments of the present invention means a software component or hardware components such as a field-programmable gate array (FPGA) or an application-specific integrated circuit (ASIC), and performs a specific function. However, the term "unit" is not limited to software or hardware. The term "unit" may be configured to be included in an addressable storage medium or to reproduce one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Embodiments of the present invention are described in detail herein with reference to the accompanying drawings so that this disclosure may be easily performed by one of ordinary skill in the art to which the present invention pertain. The invention may, however, be embodied in many different forms and should not be construed as being limited to the embodiments set forth herein. In the drawings, parts irrelevant to the description are omitted for simplicity of explanation, and like numbers refer to like elements throughout.

Embodiments will now be described more fully with reference to the accompanying drawings.

Figure 1:
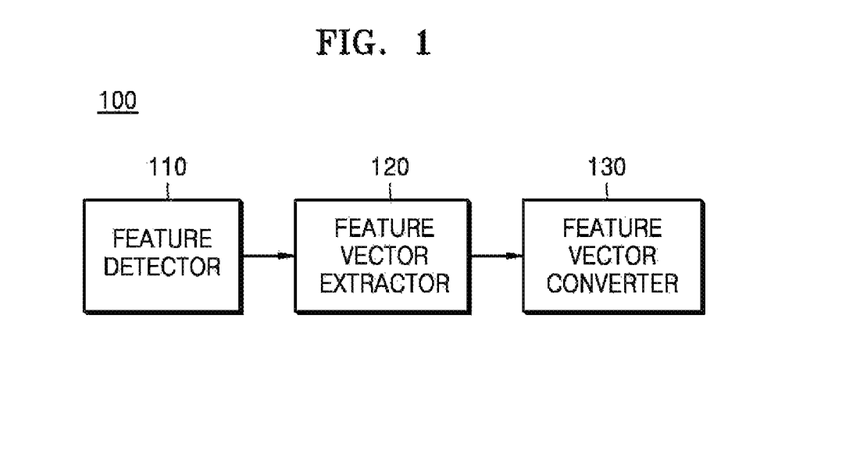
FIG. 1 is a block diagram of a device for extracting a feature vector from an audio signal of a user and converting the feature vector, according to an embodiment.

FIG. 1 is a block diagram of a device 100 for extracting a feature vector from an audio signal of a user and converting the feature vector, according to an embodiment.

The device 100 may be a terminal that can be used by a user. For example, the device 100 may be a smart TV, an ultra high definition (UHD) TV, a monitor, a personal computer (PC), a notebook computer, a mobile phone, a tablet PC, a navigation device, a smartphone, personal digital assistants (PDA), a portable multimedia player (PMP), or a digital broadcasting receiver.

The device 100 may reduce the dimension of the feature vector by taking into account the fact that classes of the feature vector may have different variance values. According to an embodiment, a class denotes a group into which a plurality of data values may be classified, in technology such as linear discriminant analysis (LDA) or heteroscedastic LDA (HLDA). The device 100 may acquire a dimension-reduced feature vector by applying a conversion matrix to the extracted feature vector to reduce the dimension of the extracted feature vector. The conversion matrix may be determined based on a matrix acquired via HLDA. When a conversion matrix is determined via HLDA and the feature vector is converted by using the conversion matrix determined via HLDA, the limitation that each class has the same variance value may be rejected, in contrast with an LDA conversion matrix.

The feature vector extracted by the device 100 may be stored as a target feature vector for identifying a user or may be compared with a target feature vector as a test feature vector, and thus may be used to identify a user. The device 100 may identify a user by performing scoring that uses an extracted feature vector and a pre-stored feature vector.

Referring to FIG. 1, the device 100 for extracting a feature vector from an audio signal may include a feature detector 110, a feature vector extractor 120, and a feature vector converter 130.

The feature detector 110 may detect a feature value of the audio signal of the user by using a mel-frequency cepstral coefficient (MFCC) method. In the MFCC method, a spectrum-based useful feature value is detected using non-linear frequency characteristics of the ear of a human. The feature value of the audio signal that may be detected by the feature detector 110 may be detected using various methods other than the MFCC method. For example, the feature value of the audio signal may be detected as a feature parameter value for a frequency sequence extracted from the audio signal.

The feature vector extractor 120 may extract a feature vector for the audio signal, based on the feature value detected by the feature detector 110.

The feature vector extractor 120 may classify the audio signal by using an ergodic hidden markov model (HMM). The feature vector extractor 120 may classify the audio signal as a state corresponding to a phonetic category by using the ergodic HMM. The phonetic category may be classified according to the feature of a voice, for example, a phonetic feature such as a frequency or a magnitude. The feature vector extractor 120 may classify the audio signal by using various methods other than the ergodic HMM.

According to a joint factor analysis method, speaker utterance may be represented as a super vector comprised of a sub-space of a speaker and a sub-space of a channel. However, speaker utterance in a total variability space may include a super vector comprised of a single space as expressed in Equation 1:

$$M = m + T\omega \quad \text{[Equation 1]}$$

where a super vector M represents utterance of a speaker, m indicates a super vector that is independent from a speaker and a channel, T indicates a total variability matrix, and ω indicates a total variability factor, namely, an i-vector. The values of M, m, and T may be acquired according to the joint factor analysis method.

The i-vector ω may be determined via baum-welch statistics as expressed in Equations 2-4.

$$N_c = \sum_{t=1}^{L} P(c \mid y_t, \lambda) \quad \text{(Equation 2)}$$

where $N_c$ indicates a matrix comprised of a diagonal block of a CF×CF dimension, and $y_t$ indicates one from among a feature sequence y={y1, y2, ... , yL} of which the length that can be detected by the feature detector 110 is an L frame.

In Equation 2, λ is a parameter in a Gaussian Mixture Models-Universal Background Model (GMM-UBM), and λ={$w_c$, $m_c$, $\Sigma_c$} (c=1, ... , C). In Equation 2, Σ included in λ is a diagonal covariance matrix of a CF×CF dimension, and C is a component dimension of a GMM. GMM-UBM is a method of classifying distribution characteristics of pieces of data when classifying patterns. In GMM-UBM, a model for data distribution may be determined according to the parameter λ.

$$\tilde{F}_c = \sum_{t=1}^{L} P(c \mid y_t, \lambda)(y_t - m_c) \quad \text{(Equation 3)}$$

where F indicates a dimension of a feature space. The feature space denotes an n-dimensional space in which a feature vector may be defined.

In Equations 2 and 3, N and F values may be acquired based on a probability value for each parameter of baum-welch statistics.

$$\omega = (I + T^t E^{-1} N T)^{-1} T^t \Sigma^{-1} \tilde{F} \quad \text{[Equation 4]}$$

As expressed in Equation 4, the i-vector $\omega$ may be determined based on T, N, and $\Sigma$ values.

In each state, a GMM parameter exists. Each GMM parameter denotes an individual model that represents a speaker. The GMM parameter may be expressed as in Equation 5.

$$\lambda_s = \{w^s_c, m^s_c, \Sigma^s_c\} \quad \text{[Equation 5]}$$

Equation 1 may be expressed as Equation 6, by including a parameter for each state:

$$M = m_s + T_s \omega_s \quad \text{[Equation 6]}$$

where $m_s$ indicates a super vector that is independent from a speaker and a channel and dependent on a phonetic category s, $T_s$ indicates a total variability matrix for the phonetic category s, and $w_s$ indicates an i-vector for the phonetic category s.

The feature vector extractor 120 may determine the i-vector $w_s$ for each state according to Equation 4.

The feature vector converter 130 may apply an HLDA conversion matrix A to a q-dimensional i-vector $\omega_s$, as shown in Equation 7, in order to reduce the dimension of the i-vector $\omega_s$ for each state determined by the feature vector extractor 120. As the dimension of an i-vector $\omega_s$ resulting from the conversion by the feature vector converter 130 is reduced, the number of calculations including the i-vector $\omega_s$ may be reduced.

$$\hat{\omega} = A\omega = \begin{bmatrix} A_{[p]} \omega \\ A_{[N-p]} \omega \end{bmatrix} \quad \text{(Equation 7)}$$

where A indicates an M×N matrix and includes $A_{[p]}$ including useful dimensions from a first row to a p-th row and $A_{[N-p]}$ including the remaining (N-p) rows. (N-p) dimensions are treated as nuisance dimensions, and thus $A_{[N-p]}\omega$ in the (N-p) dimensions may be treated as nuisance information and $A_{[p]}\omega$ until the p-th dimension may be used as useful values. Thus, the dimension of an i-vector $\hat{\omega}$ may be converted into a p dimension that is lower than N.

In LDA, covariance matrixes of all classes are assumed to be identical. However, this assumption does not comply with actual data. Thus, the feature vector converter 130 may apply to the i-vector an HLDA conversion matrix in which the fact that classes have different covariance matrices is reflected, instead of an LDA conversion matrix.

By converting the i-vector $\omega_s$ by using the HLDA conversion matrix A, the feature vector converter 130 may reduce the number of calculations performed using the i-vector $\omega_s$, and may reject a different assumption from actual data, thereby increasing the diversity between speakers and decreasing the diversity of an identical speaker.

The feature vector converter 130 may convert the i-vector $w_s$ by using a M×q-dimensional unified HLDA (UHLDA) conversion matrix C, which is a combination of LDA and HLDA conversion matrixes, instead of using the HLDA conversion matrix A, as shown in Equation 8. The feature vector converter 130 may convert the $\omega$ value by applying the UHLDA conversion matrix C instead of the HLDA conversion matrix A to the $\omega$ value, as shown in Equation 8:

$$C = [A_{q/2} \quad W_{q/2}] \quad \text{(Equation 8)}$$

$$A_{q/2} = \begin{bmatrix} a_{1,1} & \cdots & a_{1,q/2} \\ \vdots & \ddots & \vdots \\ a_{M,1} & \cdots & a_{M,q/2} \end{bmatrix}$$

$$W_{q/2} = \begin{bmatrix} w_{1,1} & \cdots & w_{1,q/2} \\ \vdots & \ddots & \vdots \\ w_{M,1} & \cdots & w_{M,q/2} \end{bmatrix}$$

where W indicates an M×N LDA conversion matrix, and $A_{q/2}$ and $W_{q/2}$ are respectively a sub-space of q/2 rows of the HLDA conversion matrix A and a sub-space of q/2 rows of the M×N LDA conversion matrix W. The UHLDA conversion matrix C is not limited to $A_{q/2}$ and $W_{q/2}$ of Equation 8, and may be comprised of some sub-spaces of the HLDA conversion matrix A and the M×N LDA conversion matrix W.

The LDA conversion matrix W and HLDA conversion matrix A may be respectively acquired by LDA and HLDA, but embodiments of the present invention are not limited thereto. The LDA conversion matrix W and HLDA conversion matrix A may be acquired according to various other methods.

For example, the HLDA conversion matrix A may be determined based on a maximum likelihood (ML) estimation and expectation maximization (EM) algorithm or smooth HLDA (SHLDA), which is another HLDA method.

The feature vector converter 130 may acquire an HLDA conversion matrix according to a probability value for a case where classes have identical averages and identical covariances and a probability value for a case where classes have different averages and identical covariances, by ML estimation. The feature vector converter 130 may assume that classes have different averages and different covariances until a p-th dimension, and assume that classes have identical averages and identical covariances from an (n-p)th dimension to an n-th dimension.

The useful dimension p of Equation 7 may be determined using Equations 9-11 below:

$$\sum^{(j)} = \frac{1}{N_j} \sum_{i=1}^{N_j} (\omega_i^{(j)} - \overline{\omega}^{(j)})(\omega_i^{(j)} - \overline{\omega}^{(j)})^t \quad \text{(Equation 9)}$$

where $\Sigma^{(j)}$ indicates a covariance matrix of an i-vector within a class of a speaker j.

$$S_w = \sum_{j=1}^{S} \frac{1}{N_j} \sum^{(j)} \quad \text{(Equation 10)}$$

where $S_w$ indicates an intra-class covariance matrix acquired under the assumption that the covariance matrices of the i-vectors of the classes of speakers are homoscedastic as in the LDA method.

$$\sigma_{S_W} = \sum_{j=1}^{N_j} \frac{1}{N_j} \left( \sum^{(j)} - S_w \right) \left( \sum^{(j)} - S_w \right)^t \quad \text{(Equation 11)}$$

where $\sigma_{S_W}$ indicates a variance matrix for an intra-class covariance matrix of each speaker. An eigen value may be acquired from the variance matrix $\sigma_{S_W}$ via eigen value decomposition. The feature vector converter 130 may obtain an accumulated energy for each dimension from eigen values of a variance matrix that are arranged in a descending order, and thus determine the number of dimensions of which accumulated energies are equal to or greater than a predetermined energy, as the useful dimension p.

The useful dimension p determined via HLDA is not limited to the above-described embodiment, and may be obtained using any of various other methods.

In addition, the feature vector converter 130 may remove noise data of the feature vector converted by probabilistic LDA (PLDA).

A method of determining the useful dimension p will now be described in more detail with reference to FIG. 2.

Figure 2:
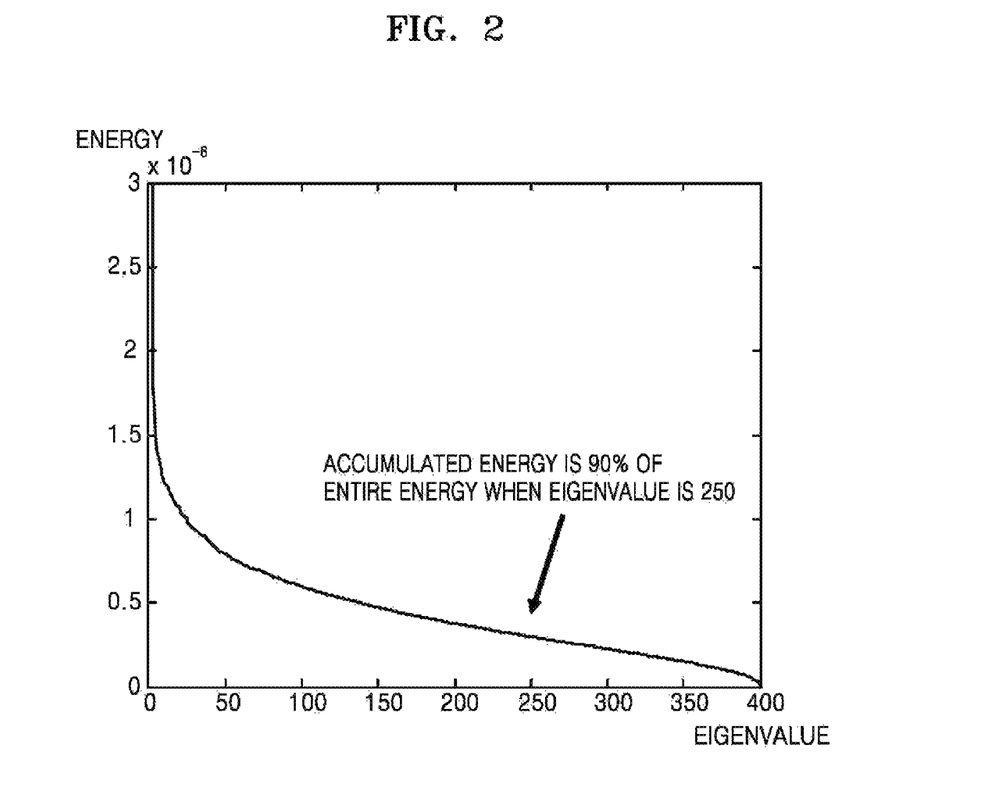
FIG. 2 is a graph showing an energy value corresponding to an eigen value of a variance matrix, according to an embodiment.

FIG. 2 is a graph showing an eigen value of a variance matrix and an energy value corresponding to the eigen value, according to an embodiment.

The graph of FIG. 2 shows each eigen value of a variance matrix and an energy value corresponding to the eigen value. As described above, the feature vector converter 130 may acquire energy for each dimension from each eigen value of a variance matrix. Accumulated energy of an eigen value may be determined from an area of the graph from 0 to the eigen value.

Assuming that a reference value of accumulated energy for determining a useful dimension is 90% of the entire energy, the feature vector converter 130 may determine an eigen value of which accumulated energy is at least 90% of the entire energy. In the graph of FIG. 2, since accumulated energy when an eigen value is 250 is 90% of the entire energy, the feature vector converter 130 may determine a dimension corresponding to the eigen value of 250 as the useful dimension p.

Figure 3:
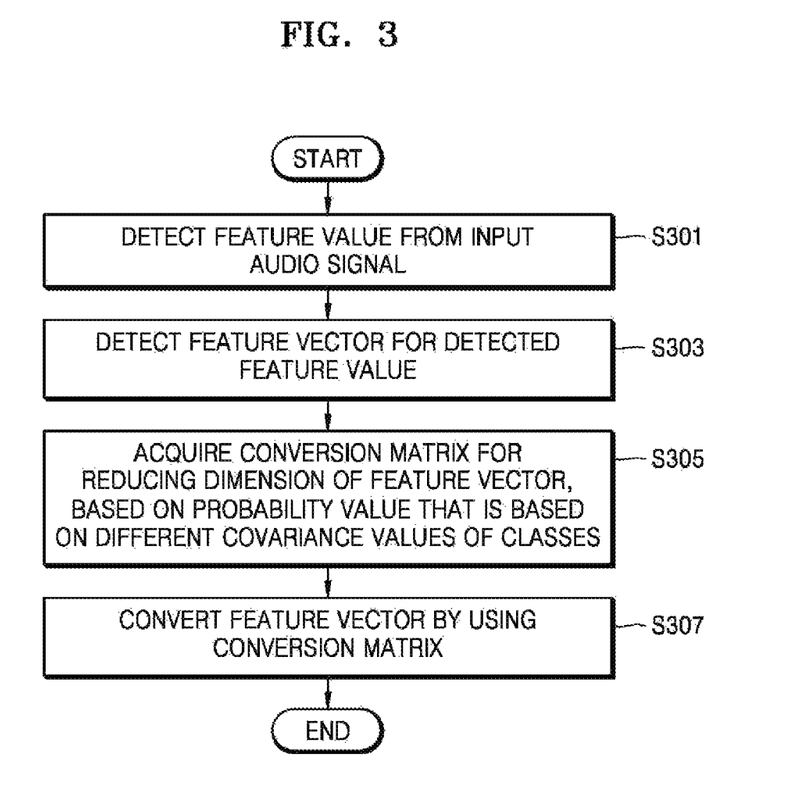
FIG. 3 is a flowchart of a method of extracting a feature vector, according to an embodiment.

FIG. 3 is a flowchart of a method of extracting a feature vector, according to an embodiment.

Referring to FIG. 3, in operation S301, the device 100 may detect a feature value from an input audio signal. For example, the device 100 may detect a feature sequence from the input audio signal, via MFCC.

In operation S303, the device 100 may detect a feature vector for the feature value detected in operation S301. The feature vector may be an i-vector obtained via joint factor analysis, and may be acquired via baum-welch statistics.

In operation S305, the device 100 may acquire a conversion matrix that assumes that classes have different covariance matrices. For example, the device 100 may acquire the conversion matrix, based on a probability value that is based on different covariance values of classes, via ML estimation.

A conversion matrix that may be acquired in operation S305 may be an HLDA conversion matrix. The HLDA conversion matrix may be acquired based on different covariance matrices of classes, in contrast with an LDA conversion matrix. Accordingly, the device 100 may convert an i-vector by reflecting the covariance matrix of actual data, rather than using an LDA conversion matrix that assumes that classes have identical covariance matrices.

In operation S307, the device 100 may convert the feature vector by using the conversion matrix acquired in operation S305.

A method of identifying a user based on a feature vector will now be described in more detail with reference to FIGS. 4 and 5.

Figure 4:
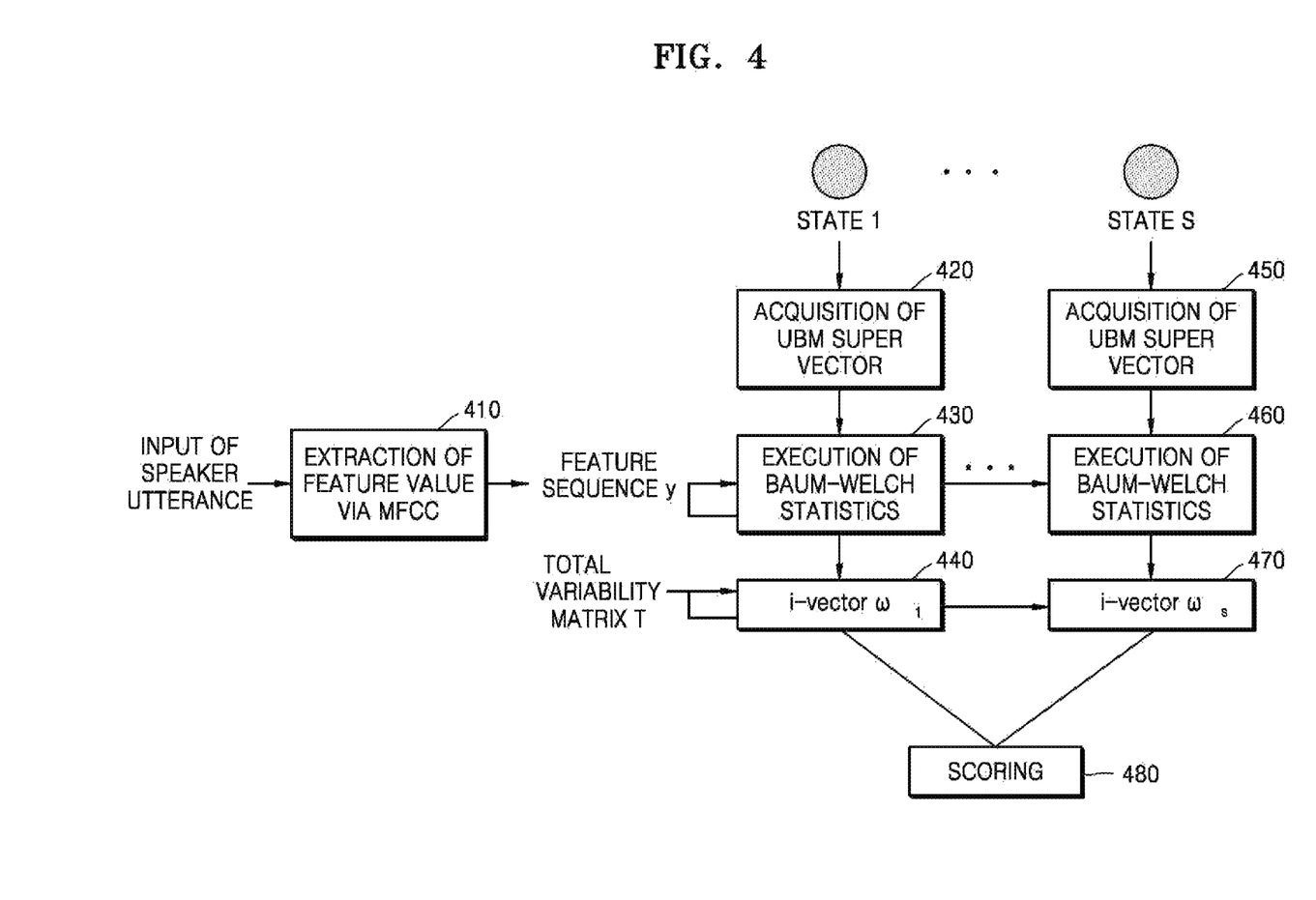
FIG. 4 is a block diagram for explaining a method of identifying a user based on a feature vector, according to an embodiment.

FIG. 4 is a block diagram for explaining a method of identifying a user based on a feature vector, according to an embodiment.

Referring to FIG. 4, in operation 410, the device 100 may extract a feature value from an audio signal including currently input speaker utterance. For example, the feature value may be extracted from a feature sequence y.

In operation 420, the device 100 may acquire a super vector m of state 1. In operation 430, the device 100 may acquire necessary parameters according to baum-welch statistics, based on the feature sequence y. In operation 440, an i-vector may be acquired based on the parameters acquired in operation 430 and a total variability matrix T.

An i-vector that is acquirable in operation 470 may be acquired via operations 450-470 according to the same method as the method of acquiring the i vector in operation 440. The i-vector in operation 440 is acquired from the audio signal including currently input speaker utterance, whereas the i-vector acquirable in operation 470 may be a feature vector previously acquired for user identification.

In operation 480, the device 100 may perform scoring by using the i-vector acquired from the currently input audio signal and an i-vector that is to be compared for user identification. The scoring may be performed as expressed in Equation 12:

$$scord(\omega_{target}, \omega_{test}) = \frac{\langle \omega_{target}, \omega_{test} \rangle}{\|\omega_{target}\| \|\omega_{test}\|} \quad \text{(Equation 12)}$$

where $\omega_{target}$ indicates a pre-acquired i-vector and $\omega_{test}$ indicates an i-vector acquired from a currently input audio signal.

Equation 12 follows a cosine distance scoring (CDS) method, and embodiments of the present invention are not limited thereto. Scoring may be performed according to any of various methods. The device 100 may identify a speaker of the currently input audio signal according to a scoring value acquired according to Equation 12. The device 100 may identify the speaker of the currently input audio signal by performing scoring with respect to the i-vector value acquired based on the currently input audio signal and performing scoring with respect to an i-vector value for each state.

Figure 5:
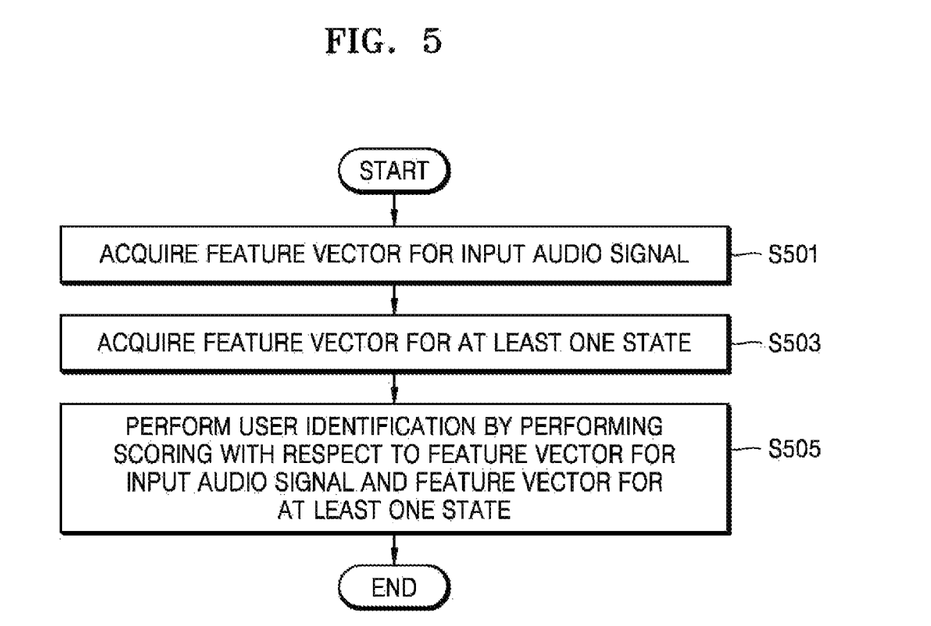
FIG. 5 is a flowchart of a method of performing scoring based on a feature vector, according to an embodiment.

FIG. 5 is a flowchart of a method of performing scoring based on a feature vector, according to an embodiment.

Referring to FIG. 5, in operation S501, the device 100 may acquire a feature vector for an input audio signal. The feature vector may be acquired according to the above-described feature vector extracting method. The feature vector may be an i-vector that may be acquired via joint factor analysis.

In operation S503, the device 100 may acquire a feature vector for at least one state. The device 100 may acquire a feature vector previously stored for user identification. The device 100 may acquire at least one feature vector for each state.

In operation S505, the device 100 may perform user identification by performing scoring on the feature vector acquired in operation S501 and the at least one feature vector acquired in operation S503. The device 100 may determine a state corresponding to the feature vector of the input audio signal by comparing a scoring value acquired based on the feature vector acquired in operation S501 with a scoring value acquired based on the feature vectors of states acquired in operation S503. The device 100 may identify the user of the currently input audio signal, based on the determined state.

The internal components of a device will now be described in detail with reference to FIG. 6.

Figure 6:
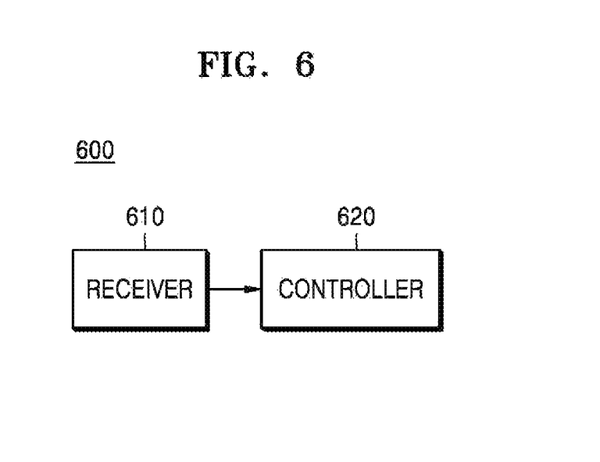
FIG. 6 is a block diagram of a device according to an embodiment.

FIG. 6 is a block diagram of a device 600 according to an embodiment.

Referring to FIG. 6, the device 600 may include a receiver 610 and a controller 620.

The receiver 610 may receive an audio signal including utterance of a user. For example, the receiver 610 may receive an audio signal including utterance of a user, via a microphone.

The controller 620 may extract a feature vector, based on the audio signal received by the receiver 610. The controller 620 may extract an i-vector by joint factor analysis and reduce the dimension of the i-vector by using an HLDA conversion matrix. The controller 620 may identify a speaker corresponding to a currently input audio signal by performing scoring on a feature vector corresponding to the currently input audio signal and a feature vector for each state.

According to an embodiment, the performance of speaker recognition may be increased by reducing the dimension of an i-vector by using an HLDA conversion matrix which takes into account the fact that classes have different covariance matrices.

Methods according to some embodiments may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present invention or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as ROM, random-access memory (RAM), or a flash memory. Examples of the program commands are advanced language codes that can be executed by a computer by using an interpreter or the like as well as machine language codes made by a compiler.

The exemplary embodiments should be considered in descriptive sense only and not for purposes of limitation. Descriptions of features or aspects within each embodiment should typically be considered as available for other similar features or aspects in other embodiments.

While the inventive concept has been particularly shown and described with reference to exemplary embodiments thereof, it will be understood that various changes in form and details may be made therein without departing from the spirit and scope of the following claims.

The invention claimed is:

1. A method of identifying a user from an audio signal in a device, the method comprising:
   receiving the audio signal including an utterance the user via a microphone;
   extracting a feature sequence from the audio signal including the utterance of the user;
   extracting a feature vector from the feature sequence;
   acquiring a conversion matrix for reducing a dimension of the feature vector, based on a probability value acquired based on different covariance values;
   converting the feature vector by using the conversion matrix; and
   identifying the user from the audio signal by using the converted feature vector,
   wherein the acquiring of the conversion matrix comprises acquiring a dimension p as a useful dimension p of the conversion matrix based on whether an energy accumulated up to the dimension p of a variance matrix for an intra-class covariance matrix of each speaker is more than an energy of a predetermined ratio of an entire energy for an entire dimension of the variance matrix, and a dimension of the feature vector is converted into the useful dimension p.

2. The method of claim 1, wherein the conversion matrix is a heteroscedastic linear discriminant analysis (HLDA).

3. The method of claim 1, wherein the feature vector is an i-vector that is acquirable by joint factor analysis.

4. The method of claim 1, further comprising:
   performing scoring on a feature vector resulting from the conversion and a feature vector of each state, at least once,
   wherein the user is identified based on a result of the scoring.

5. A non-transitory computer-readable recording medium having recorded thereon a program for executing the method of claim 1.

6. A device for identifying a user from an audio signal, the device comprising:
   a receiver which receives the audio signal including an utterance of the user via a microphone; and
   a controller which extracts a feature sequence from the audio signal, extracts a feature vector from the feature sequence, acquires a conversion matrix for reducing a dimension of the feature vector, based on a probability value acquired based on different covariance values, converts the feature vector by using the conversion matrix, and identifies the user from the audio signal, by using the converted feature vector,
   wherein the controller acquires a dimension p as a useful dimension p of the conversion matrix based on whether an energy accumulated up to the dimension p of a variance matrix for an intra-class covariance matrix of each speaker is more than an energy of a predetermined ratio of an entire energy for an entire dimension of the variance matrix, and a dimension of the feature vector is converted into the useful dimension p.

7. The device of claim 6, wherein the conversion matrix is a heteroscedastic linear discriminant analysis (HLDA).

8. The device of claim 6, wherein the feature vector is an i-vector that is acquirable by joint factor analysis.

9. The device of claim 6, wherein the controller performs scoring on a feature vector resulting from the conversion and a feature vector of each state, at least once, and identifies the user, based on a result of the scoring.

* * * * *